United States Patent [19]

Erdmann

[11] Patent Number: 4,986,737
[45] Date of Patent: Jan. 22, 1991

[54] DAMPED GAS TURBINE ENGINE AIRFOIL ROW

[75] Inventor: Omer D. Erdmann, Cincinnati, Ohio

[73] Assignee: General Electric Company, Cincinnati, Ohio

[21] Appl. No.: 291,835

[22] Filed: Dec. 29, 1988

[51] Int. Cl.⁵ ............................................. F01D 5/22
[52] U.S. Cl. ................................. 416/190; 416/193 R
[58] Field of Search ............... 416/190, 193 R, 144, 416/145, 500; 415/119, 191

[56] References Cited

U.S. PATENT DOCUMENTS

| | | | |
|---|---|---|---|
| 1,378,464 | 5/1921 | Junggren. | |
| 1,554,614 | 9/1925 | Allen | 416/190 |
| 2,310,412 | 2/1943 | Flanders | 416/190 |
| 2,610,823 | 9/1952 | Knowlton | 416/190 |
| 3,185,441 | 8/1962 | Reuter. | |
| 3,326,523 | 6/1967 | Bobo. | |
| 3,649,133 | 3/1972 | Wagner | 416/190 |
| 3,728,041 | 4/1973 | Bertelson | 415/191 X |
| 3,752,599 | 8/1973 | Pace | 416/190 |
| 3,936,230 | 2/1976 | Helmintoller, Jr. et al. | 416/193 R |
| 4,177,013 | 12/1979 | Patterson et al. | 416/190 X |
| 4,285,633 | 8/1981 | Jones | 415/191 |
| 4,497,611 | 2/1985 | Keller | 415/191 |
| 4,621,976 | 11/1986 | Marshall et al. | 415/191 |
| 4,655,682 | 4/1987 | Kunz et al. | 415/119 |
| 4,721,434 | 1/1988 | Marshall et al. | 415/119 |

FOREIGN PATENT DOCUMENTS

| | | | |
|---|---|---|---|
| 720176 | 3/1980 | U.S.S.R. | 416/190 R |
| 787689 | 12/1980 | U.S.S.R. | 416/190 R |
| 1509185 | 5/1978 | United Kingdom | 416/190 R |

OTHER PUBLICATIONS

*Leading Edge*, "Counterrotation and Campbell's Criterion," Kirkpatrick, R. A. and Stoughton, P. H., Fall, 1986, pp. 26-27.
*Journal of Engineering for Power*, "Traveling Wave Vibration of Gas Turbine Engine Shells," Macke, H. J., pp. 1-9.

*Primary Examiner*—Edward K. Look
*Assistant Examiner*—Hoang Nguyen
*Attorney, Agent, or Firm*—Jerome C. Squillaro

[57] ABSTRACT

Disclosed is a vibration damped gas turbine engine airfoil row. The airfoil row, comprising first and second coaxial, circular spools and airfoils extending radially therebetween, is cast in at least one piece and then the second or inner spool is cut between adjacent airfoils. Damping inserts are held in place adjacent the inner surface of the second spool by a retaining means.

22 Claims, 3 Drawing Sheets

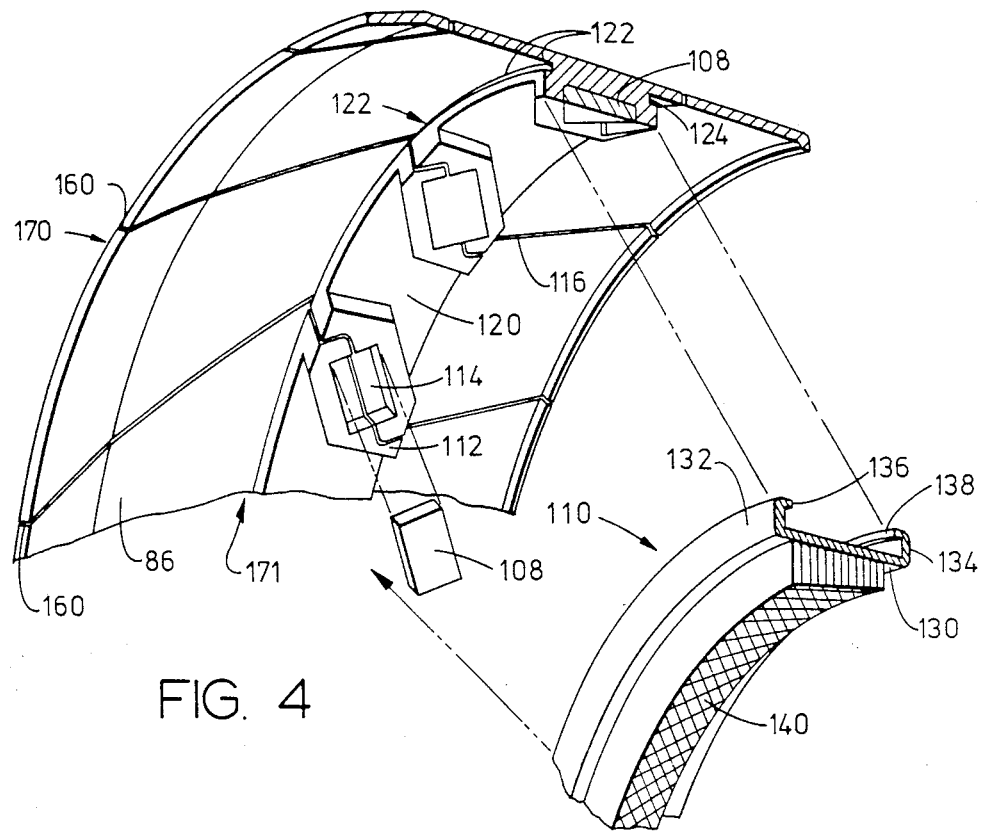
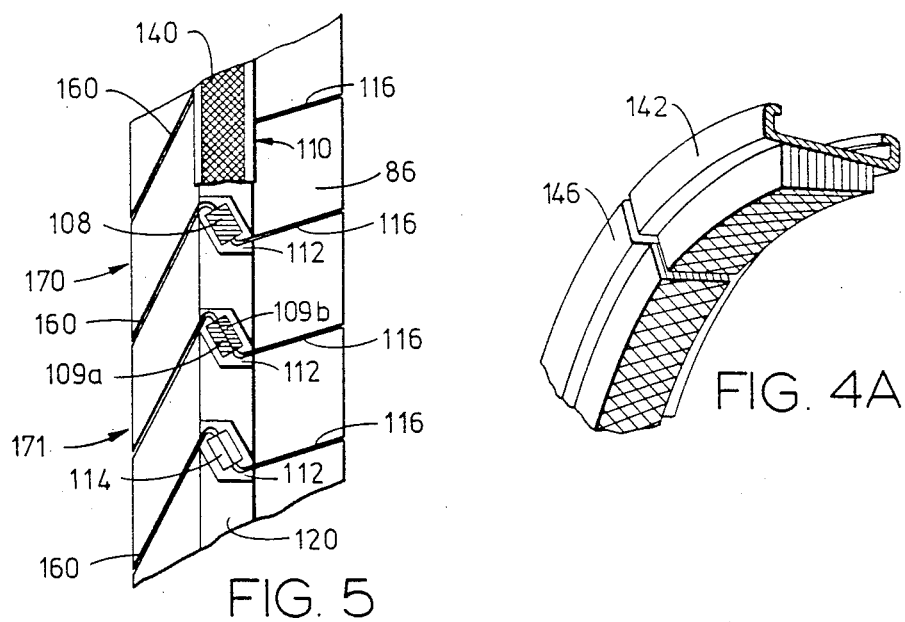

DAMPED GAS TURBINE ENGINE AIRFOIL ROW

The present invention relates to apparatus for damping vibrations in a gas turbine engine. More particularly, the present invention relates to damping vibrations in an airfoil row of such an engine.

BACKGROUND OF THE PRESENT INVENTION

Gas turbine engines typically include a gas generator that defines an annular flow path and comprises, in an axial flow relationship, a compressor section for compressing air flowing along the flow path; a combustor section in which the compressed air is mixed with fuel and ignited to produce a high energy gas stream; and a turbine section that extracts energy from the gas stream to drive the compressor. Commonly many such engines also include a second turbine section known as a power turbine which drives a fan or propeller. One such type of engine known in the art utilizes a power turbine comprising alternately counter rotating blade rows that drive counter rotating fan blades.

Gas turbine engines generally, and their component parts in particular, are subject to vibrational stress and fatigue from a number of causes, including rotor rotational imbalance and pressure differentials within the engine. The vibrations can be so serious that the lifetime and integrity of a compressor or turbine casing, or the rotors and airfoils thereof, can be negatively impacted. Airfoil losses have occurred and in some instances, losses of pieces of airfoils have produced secondary failures on adjacent, downstream airfoils. While actual part failures are rare, structural damage to an engine may occur due to rubbing between vibrating engine parts. Such rubs are additionally undesirable due to the wear gaps, which can decrease engine performance, that are created between the rubbing parts. Therefore, because close tolerances between engine parts are required for good engine performance, minimization of engine vibration is desirable.

Vibrations are of greatest concern when the resonance frequency of the engine component part lies within the frequency range of the vibrations expected to occur during normal engine operations. Long, thin parts, for example airfoils such as low pressure compressor and turbine blades, vanes, and nozzles, and parts having a circular cross section such as rotors are of particular concern in this regard. Engine parts having circular cross sections are subject to nodal diameter vibration, a form of vibration characterized by two (or more in higher vibration modes) nodes on the circumference of the component part remaining stationary while parts therebetween oscillate.

Because of concern about the debilitating effects of gas turbine engine vibration, much industry time and effort has been devoted to the elimination or reduction of engine vibrations. Attempts to deal with vibrations have taken several lines of attack. One avenue of effort has taken the form of damping the component vibrations that do occur by the use of external means so as to keep them from reaching excessive levels of stress and deflection. Thus, turbine blades may be damped, for example, by the use of a "Z" interlock in the tip shrouds. That is, the vibrations are damped by the relative motion of the shrouds rubbing against one another such that the vibratory energy is absorbed. Another approach aimed at minimizing the problem is to increase the resonance frequency of a rotor, blade, or other component part by increasing the mass of the part, i.e., by making the part thicker and thereby stiffening it. The resonance frequency of the part is thereby increased so that it lies outside the vibrational frequency range expected in an operating engine. Increasing the mass of a part introduces excess weight and performance inefficiencies, however, and is not a desirable solution.

One method of stiffening that does not increase engine mass is to cast one or more parts as a unit. Thus, a compressor or turbine ring, including the appropriate airfoils and shrouds, can be cast as either a single unit or in large segments that are later joined together. Such large segment or full ring casting of an airfoil ring provides the necessary stiffness to increase the resonance frequency of the ring above anticipated nodal vibrational frequencies. In addition, this type of casting offers potential cost benefits; simplifies assembly of the compressor or turbine structure; and reduces engine weight, thereby increasing engine performance, by eliminating the apparatus otherwise needed to attach the airfoils to the ring. Nevertheless, while such casting stiffens the circular part, i.e., the ring, it does not provide for the damping of the airfoil oscillations that may occur, and, therefore, does not find ready application in present day gas turbine engines.

OBJECTS OF THE PRESENT INVENTION

It is a principal object of the present invention to provide a new and improved method and new and improved apparatus that is not subject to the foregoing disadvantages.

It is an object of the present invention to provide new and improved apparatus useful in a gas turbine engine that will be less subject to vibrational stress and fatigue.

It is yet another object of the present invention to prolong the lifetime of gas turbine engine component parts by reducing the vibrational stress to which the parts are subjected.

It is another object of the present invention to provide a method for manufacturing a damped airfoil row of a gas turbine engine.

It is still another object of the present invention to reduce the life cycle operating costs of a gas turbine engine by reducing the vibrational stress to which component engine parts are subject and thereby reducing the frequency of repair or replacement of such parts.

It is still yet another object of the present invention to provide effective airfoil-to-airfoil damping in a full ring airfoil row casting.

It is a further object of the present invention to reduce the weight of a gas turbine engine and to improve engine performance by enabling full ring airfoil row castings to be utilized on the engine.

It is still a further object of the present invention to provide a new and improved turbine including at least one damped full ring blade row casting.

SUMMARY OF THE PRESENT INVENTION

The foregoing objects of the present invention are achieved by providing a damped airfoil row cast as a single unit, or in large segments that are later joined together, and a method for manufacturing the same. Thus, in accordance with the present invention a damped airfoil row comprises substantially circular, coaxial first and second spools joined to each other by a plurality of airfoils radially extending therebetween, each airfoil defining a radius of the spools. The second spool is substantially axially cut between adjacent airfoils. The inner surface of the second spool includes a plurality of recesses substantially centered between the airfoil-defined radii, each recess being cut by a cut line extending clear through the second spool from the inner to the outer surface and being capable of receiving a damping insert. A damping insert is placed into each recess and secured therein.

In one embodiment of the present invention, the first spool may form a portion of the rotor in a turbine having counter rotating blade rows. In this embodiment, the second spool forms a shroud at the airfoil tips.

These and other objects of the present invention, as well as further features and advantages thereof, will become apparent from a reading of the following detailed description of the invention in conjunction with the accompanying drawings, all of which are intended to be typical of, rather than in any way limiting on, the scope of the present invention. If appropriate, applicable reference numerals have been carried forward.

BRIEF DESCRIPTION OF THE DRAWINGS

FIG. 4 shows an exploded view of a portion of a second spool in accordance with the present invention.

FIG. 4a shows in partial view a plurality of segments of a retainer in accordance with the present invention.

FIG. 5 depicts in plan view an extended portion of the second spool of FIG. 4.

DETAILED DESCRIPTION OF THE INVENTION

Figure 1:
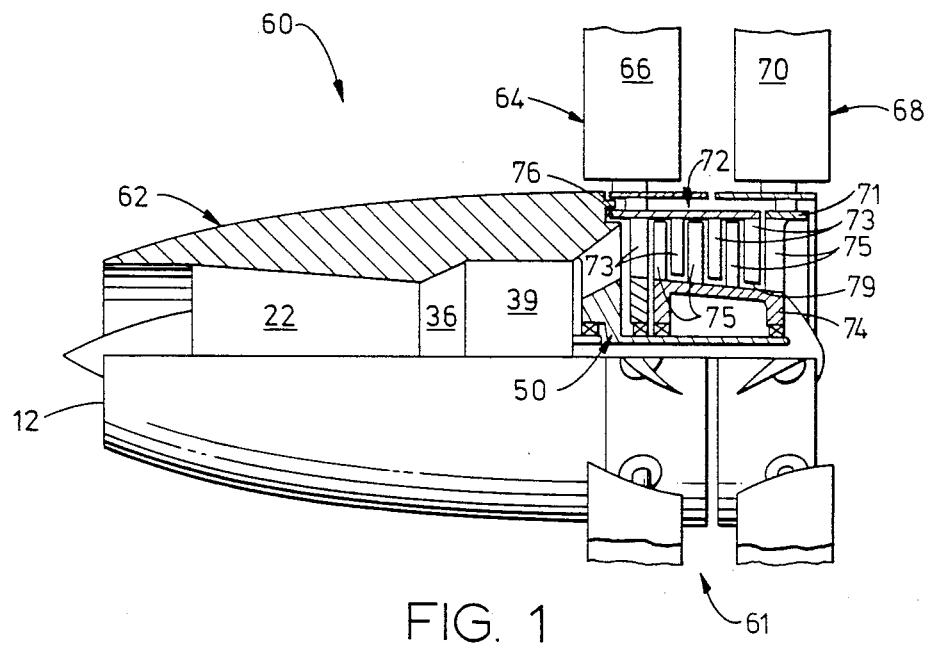
FIG. 1 illustrates in partial schematic cross section a gas turbine engine including aft mounted counter rotating fans.

FIG. 1 illustrates a gas turbine engine 60, one of the types of gas turbine engines in which the present invention may find application. Typically, such engines comprise a gas generator section 62 that includes a compressor section 22, a combustor section 36, and a turbine section 38 comprising a high pressure turbine 39. The compressor, combustor, and turbine sections cooperate to define an annular flow path for passage of a gas stream through the engine. Compressor 22 includes in a manner known in the art separate pluralities of stationary, circumferentially spaced airfoils known as compressor stator vanes interdigitated with separate pluralities of moving, circumferentially spaced airfoils known as compressor rotor blades. An entire ring of vanes or blades is known as a row of airfoils, while a row of vanes together with a row of blades is known as a stage. Each of the stationary vanes is attached to the compressor casing. Each compressor rotor blade is attached to a compressor rotor, which is itself connected by means of an interconnecting shaft to the turbine section 38.

Referring still to FIG. 1, high pressure turbine 39 comprises in a manner well known in the art separate pluralities of circumferentially spaced stationary turbine nozzles and moving turbine blades. Each plurality of nozzles and blades is composed of individual nozzles and blades. An entire circumferential ring of nozzles or blades is also known as an airfoil row and combined rows of circumferentially spaced blades and nozzles are also commonly referred to as a stage. Similarly to the vanes and blades of compressor 22, each of the stationary nozzles are attached to the casing of high pressure turbine 39 while each of the moving high pressure turbine blades is attached to the high pressure turbine rotor. The high pressure turbine rotor in turn is connected to the compressor 22 by a shaft as previously mentioned.

Figure 2:
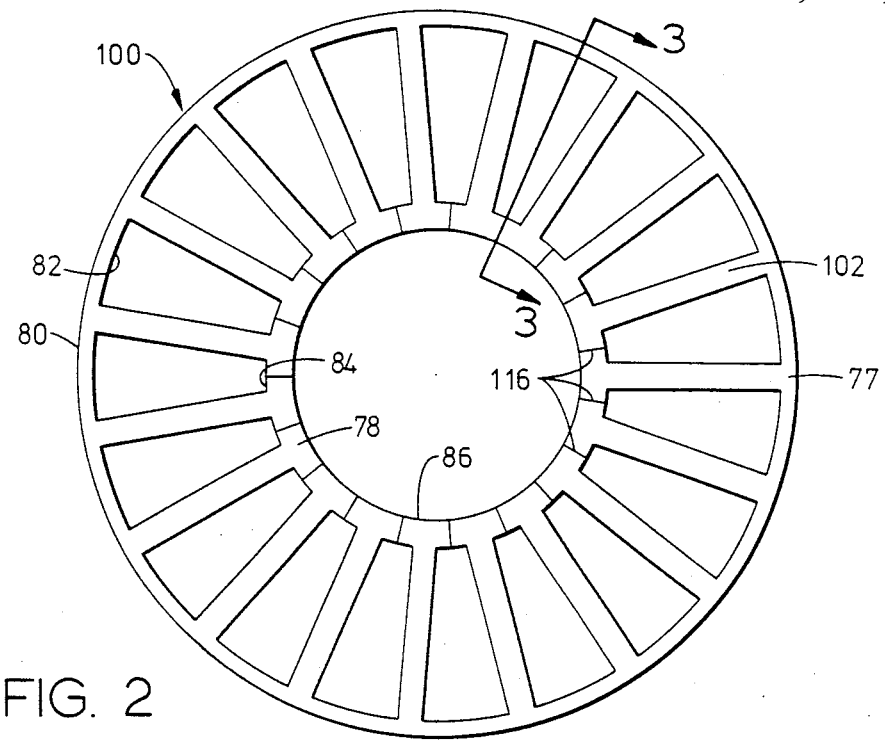
FIG. 2 illustrates in schematic elevation view a full ring airfoil row casting, which may find application in a gas turbine engine of the type depicted in FIG. 1, having cut lines between adjacent turbine blades.

Also shown in FIG. 1 is a propulsor or fan section 61 located aft of a gas generator 62, which produces combustion exhaust gases effective for powering the propulsor. Propulsor 61 includes a power turbine 50 that includes a first and a second turbine, 72 and 74 respectively, that counter rotate. Turbines 72 and 74 each comprise separate pluralities of rows of circumferentially spaced, interdigitated turbine blades 73 and 75 respectively. Energy is extracted from the exhaust gas stream by counter rotating turbines 72 and 74, thereby driving a forward and a rear plurality of fan blades, 64 and 68 respectively, in a counter rotating manner. Thus, as seen in FIG. 2, the forward plurality of fan blades 64 includes a preselected number of individual fan blades 66 circumferentially spaced around engine 60 and attached to an outer rotor 76 of the first counter rotating turbine 72. Similarly, the rear plurality of fan blades 68 includes a preselected number of individual fan blades 70 circumferentially spaced around engine 60 and attached to an outer shroud band 71 of the second counter rotating turbine.

During engine operation, ambient air enters an air intake 12 of engine 60 and is worked upon by compressor 22 to form a compressed air stream. The compressed air enters combustor 36 where it is mixed with fuel and the resulting mixture ignited. The combustion products, i.e., the exhaust gases, pass into the turbine section and impinge upon the turbine blades, thereby causing high pressure turbine 39 and power turbine 50 to rotate. The turbine rotation in turn rotates compressor 22 by means of interconnecting shafts. Turbines 72 and 74 of power turbine 50 counter rotate, thereby driving fans 64 and 68 in a counter rotating manner and providing thrust to move the aircraft.

While the present invention will be described in relation to its application in power turbine 50 it will be recognized that its use is not so limited. Engine 60 could include other counter rotating sections in the compressor or turbine sections. Thus, by means of illustration only, compressor section 22 of gas generator 62 may include a counter rotating portion where the present invention may be used. In addition, it will be clear that while the present invention is described in relation to its use as a moving blade row, it is equally useful as a stationary airfoil row of a gas turbine engine compressor or turbine.

Figure 3:
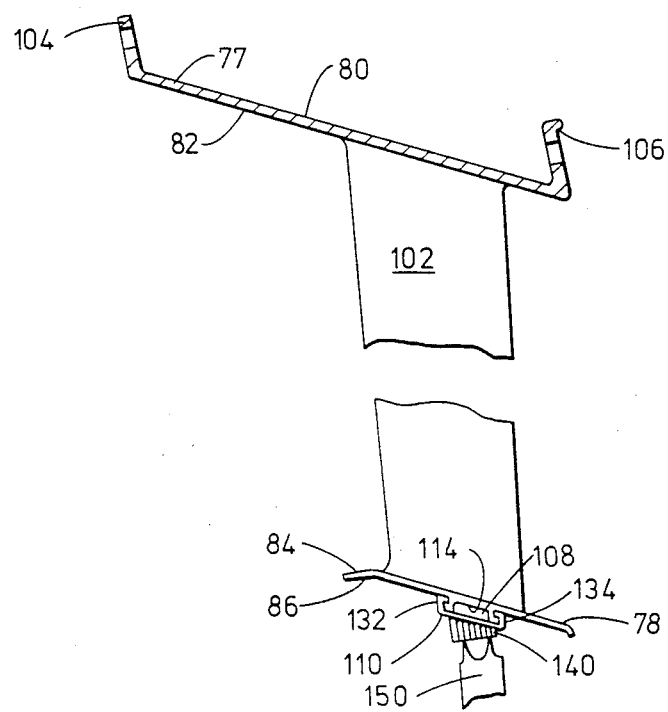
FIG. 3 illustrates in partial cross section a full ring airfoil row casting along lines I—I of FIG. 3 in accordance with the present invention.

As previously noted, casting an entire airfoil row as either a single ring or in large segments presents notable advantages in terms of engine weight and offers cost benefits as well. FIG. 3 depicts an example of a full ring casting. Thus, as depicted there, a full ring, airfoil row casting 100 useful on an engine of the type depicted in FIG. 1 includes a first spool 77 and a second spool 78 joined by a plurality of substantially equidistantly spaced airfoils 102 extending radially therebetween. "Radially" is used in this sense as being generally in a direction transverse to the axis of casting 100 or, in other words, as being generally in a direction from the second spool to the first spool.

First spool 77 is defined in part by outer and inner first spool surfaces 80 and 82 respectively and has a substantially circular cross section. First spool 77 further includes flanges 104 and 106 projecting radially therefrom, as shown in FIG. 3, whereby casting 100 may be attached to the appropriate engine parts. Second spool 78 is similarly partly defined by outer and inner second spool surfaces 84 and 86 respectively. Each airfoil 102 defines a radius, in the sense given above, of spools 77 and 78 and is integrally attached at its opposite ends to first spool inner surface 82 and second spool outer surface 84. In an engine of the type depicted in FIG. 1, first spool 77 would constitute a portion of outer rotor 76, while second spool 78 would form an inner shroud band 79 for the airfoil tips.

A preferred embodiment of the present invention is best seen in FIGS. 3, 4, and 5. As illustrated there, airfoil row 100 includes a plurality of cut lines 116 axially extending through the width of the second spool. Each cut line 116 is made substantially midway between adjacent airfoils as best seen in FIG. 2, and completely through the second spool from the inner to the outer surface. Thus, there is an equal number of cut lines and airfoils. The location of the cut lines between the airfoils is a matter of convenience but should be made such that the center of gravity of the cut portion of the spool is nearby the center of gravity of the airfoil to minimize the bending moments created by the centrifugal force of the rotation of the airfoil row. Cut lines 116 preferably have a "Z" configuration, similar to that found between tip shrouds of conventional turbine blading, though the exact configuration of the cut lines is not important to the present invention. "Z" cut lines are well known in the art and can be made in casting 100 by known methods, such as electric-discharge machining (EDM) or laser cutting.

With particular reference now to FIGS. 3 and 4, associated with each cut line on second spool inner surface 86 is a boss 112 and a recess 114 machined therein. Boss 112 is formed during casting on a continuous thickened ridge 120 that circles the entirety of casting 100. Ridge 120 has a substantially rectangular cross section and includes grooves 122 and 124, whose function will be explained below, disposed on opposite sides thereof. Boss 112 is shown configured as a hexagon and is positioned substantially in the center of second spool inner surface 84, with two of its six sides parallel to the circumferential edges of the surface. The present invention is not limited to the configuration shown, however, and other cross sectional shapes for boss 112 are equally permissible. Furthermore, rather than having individual bosses associated with each cut line, ridge 120 could be thickened throughout its circumference and recesses 114 machined therein. The use of a plurality of bosses is advantageous, however, in that it results in a casting of lesser weight than one having a continuous thickened ridge.

Recess 114 is configured substantially as a rectangle in cross section and has a depth substantially less than its width and length. Recess 114 is configured to accept a damping insert 108 and, should damping insert 108 be otherwise configured, so should recess 114. The recess may be cast as part of the airfoil row and may then be trimmed by conventional means, including EDM or end milling, or it may be completely machined into boss 112 by such means. The diagonals of cut lines 116 substantially bisect recesses 114 in its width dimension as shown in FIGS. 4 and 5, though the exact positioning of the cut line in relation to recess 114 is not critical to the present invention.

Damping insert 108 is manufactured from a suitable wear resistant material and would typically comprise a molybdenum alloy. As shown in FIGS. 4 and 5 damping insert 108 has a substantially parallelepiped configuration, though, as noted in the preceding paragraph, other shapes may also be used. As configured in the drawing, insert 108 preferably has a depth less than its width and length. Representative dimensions of the insert, for example, could be $1.9 \times 0.95 \times 0.25$ cm. The present invention is not limited to those dimensions, however, and others may suitably be used in accordance therewith. Damping insert 108 could consist of multiple insert pieces within the scope of the present invention. In such a circumstance, the pieces would be brazed or welded in place within recess 114. That is, as shown in FIG. 5, insert 108 could comprise, for example, two identically shaped pieces 109a and 109b which are welded or brazed into respective portions of recess 114.

In a preferred embodiment of the present invention, insert 108 is slightly wider and shorter than recess 114. Thus, when the damping insert is placed within recess 114 it will force or push apart the adjacent cut sections of inner spool 78, such as, for example, sections 170 and 171, in the area of the recess, thereby imparting a twist to the blades and creating a load between the opposing lengthwise edges of the recess and the edges of the insert. As a result, a clearance gap 160 will be present between adjacent cut spool sections as seen in FIGS. 4 and 5. Stated differently, placement of a damping insert within a recess 114, then, causes each adjacent cut section of inner spool 78 to slightly twist, which results in a narrowing of the pre-insertion gap existing between cut sections and the maintenance of the clearance gaps depicted in the Figures. The only point of contact between adjacent cut sections will be between each insert and its respective recess walls.

As best seen in FIGS. 3 and 4, the damping insert 108 is retained within recess 114 by any suitable means such as a retainer 110. Preferably, retainer 110 is a substantially continuous ring-like structure and comprises a hoop 130 having radially outward extending retention flanges 132, 134, each flange having a lip 136, 138, respectively, extending perpendicularly to flanges 132 and 134. Lips 136 and 138 matingly engage grooves 122, 124, respectively, on ridge 120. Preferably the grooves are continuous 360° cuts to ensure a positive seal that does not allow gas leakage. When properly positioned, retainer 110 securely holds the damping insert 108 within the recess 114. Retainer 110 functions principally as a retaining mechanism primarily during engine shutdowns since the significant centrifugal forces developed during engine operation would act to hold the damping inserts in proper position with very little help needed from retainer 110.

Alternatively to a continuous 360° hoop, the retainer may comprise a plurality of segments of a ring rather than a continuous structure. Thus, portions of two segments of a plurality thereof are depicted in FIG. 4a. As seen there, a retainer comprising a retainer segment 142 abuts an adjacent retainer segment 146. The use of such a segmented retainer would simplify installation of the retainer.

Retainer 110, or the retainer segments, may include a honeycomb seal 140 attached to hoop 130. Honeycomb seals are well known in the art; therefore, an extensive description will not be provided herein. Honeycomb seal 140 sealingly engages engine seal teeth 150, shown in FIG. 3, which extend radially outward from the interior of the engine in a manner known in the art, thereby preventing the unwanted, efficiency reducing loss of gases.

To illustrate briefly how the inventive structure functions, during engine operation casting 100 will be subjected to buffeting from the passing gas stream as well as vibrations from other sources within the engine, resulting in vibratory motion of airfoils 102. The inserts 108 damp the airfoil vibrations by absorbing the vibratory energy of those vibrations. This results from the placement of each damping insert 108 within its recess so as to force the adjoining airfoils apart and create a load against selected sides of the recess, depending upon the particular configuration chosen for the insert and recess. When perturbed, each insert rubs against the loaded sides of its respective recess and absorbs the vibratory energy. This level of absorption is sufficient to prevent the airfoil vibrations from reaching deflection extremes great enough to cause failure or fracture of the part.

While the described functioning of the inventive structure applies to the preferred embodiment shown, it should be obvious that damping could be accomplished by the inventive structure where the damping insert 108 is slightly smaller, i.e., shorter and narrower, than the recess 114. In this alternate embodiment retainer 110 would force insert 108 into contact with the bottom of the recess and the damping would occur between the relative motion of the insert and the bottom of the recess rather than its sides. In this embodiment, then, retainer 110 would function to retain each insert 108 in tight contact with the bottom of each recess 114 at all times.

The present invention, then, allows the use of a full ring casting in a gas turbine engine by reducing damaging vibrational stress and fatigue and reduces costs by reducing the frequency of repair or replacement of airfoils or other parts. Furthermore, the present invention reduces engine weight by enabling full ring castings to be used, thereby substantially reducing the number of parts used to assemble the engine in general and the airfoil structures in particular. That is, the apparatus needed to attach blades to rotors and vanes and nozzles to casings is reduced if not completely eliminated. The consequent reduction in weight improves engine performance.

While the present invention has been described generally and with particular reference to a turbine blade row utilized in a counter rotating gas turbine engine, it is not so limited. Thus, it may also find use in a counter rotating low pressure compressor or in a high or low pressure turbine of other types of gas turbine engines known in the art. In addition, while full ring castings are most desirable, casting an airfoil row in a plurality of large segments that are then joined to form a single ring would also fall within the scope of the present invention. Thus, the present invention could be utilized in either segmented or full ring castings in a stationary row of compressor stator vanes or turbine nozzles of gas turbine engines such as is well known in the art, or in a low pressure, counter rotating compressor or turbine such as that shown in FIG. 1. Where used as a vane or nozzle row, the first spool would form a part of the casing and the second spool would form a shroud for the vanes or nozzles. Where airfoil row 100 is used as a rotating blade row, such as in a counter rotating compressor or turbine, first spool 77 would form part of a rotor, while the second spool would from a shroud for the airfoils. Additionally, damping could be done in airfoil groups rather than with respect to each airfoil. Thus, a damping insert could be associated with selected groups of two or more airfoils. In other words, rather than cutting the second spool between each airfoil, cut lines could be made between selected groups of two or more airfoils or airfoil defined radii. Criteria for deciding whether to make cut lines between each airfoil or between groups of airfoils include manufacturing convenience and damping requirements of the particular airfoil row.

Having thus described preferred embodiments of the present invention, numerous changes, substitutions, modifications and alterations will now suggest themselves to those skilled in the art, all of which fall within the spirit and scope of the present invention. Accordingly, it is intended that the invention be limited only by the scope of the appended claims.

What is claimed is:

1. A method for manufacturing a vibration damped rotating turbine airfoil row comprising a first spool having a substantially circular cross section and being partially defined by inner and outer first spool surfaces; a second spool having a substantially circular cross section and being partially defined by inner and outer second spool surfaces; and a plurality of circumferentially spaced airfoils extending radially between said first and second spools, each of said airfoils being integrally attached at opposing ends thereof to said inner surface of said first spool and to said outer surface of said second spool, respectively, wherein said spools are coaxial and said first spool has a greater diameter than said second spool, said method for manufacturing comprising:

casting said airfoil row;

cutting said second spool between selected ones of said airfoils, thereby forming a plurality of cut lines;

attaching a damping insert to said inner surface of said second spool in association with each said cut line.

2. The method of claim 1 wherein said full ring airfoil row is cast as a single piece.

3. The method of claim 1 including attaching a retaining means to said inner surface of said second spool for holding said damping inserts therein, wherein said retaining means includes a means for sealing by engaging engine seal teeth.

4. The method of claim 1 wherein said cut lines have generally the configuration of a "Z".

5. The method of claim 4 wherein said cut lines are made by a laser.

6. The method of claim 4 wherein said cut lines are made by electric-discharge machining.

7. The method of claim 4 and further including machining a plurality of damping insert recesses on said inner surface of said second spool, each of said recesses being capable of receiving one of said damping inserts.

8. The method of claim 7 wherein each of said damping inserts has an essentially rectangular parallelepiped configuration and each of said recesses is configured to receive one of said damping inserts.

9. The method of claim 8 wherein each of said recesses is positioned such that the diagonal of said associated "Z" cut line bisects said recess.

10. The method of claim 7 wherein said recesses are machined by electric-discharge machining.

11. A vibration damped, full ring rotating turbine airfoil row comprising:
   a. an airfoil row including substantially circular, coaxial first and second spools, said first and second spools being partially defined by inner and outer first and second spool surfaces respectively, said second spool having a lesser diameter than said first spool, said inner surface of said first spool and said outer surface of said second spool being joined by a plurality of airfoils extending generally radially therebetween, said airfoils being spaced generally equidistant from adjoining airfoils and defining radii of said spools; and
   b. a plurality of means for damping attached to said second spool inner surface between selected ones of said radii.

12. The airfoil row of claim 11 wherein said second spool is axially cut between said selected ones of said radii, thereby defining a plurality of cut lines.

13. The airfoil row of claim 12 wherein each of said cut lines is substantially configured as a "Z".

14. The airfoil row of claim 13 wherein said damping insert is substantially configured as a rectangular parallelepiped.

15. The airfoil row of claim 14 wherein each of said cut lines intersects a damping insert recess configured to receive one of said plurality of damping inserts.

16. The airfoil row of claim 11 and further comprising a retainer attached to said second spool inner surface for retaining said damping inserts.

17. The airfoil row of claim 16 wherein said retaining means includes a honeycomb seal.

18. The airfoil row of claim 11 wherein each of said damping inserts comprises a plurality of insert pieces.

19. The airfoil row of claim 16 wherein said retainer comprises a continuous hoop including a seal.

20. The airfoil row of claim 16 wherein said retainer comprises a segmented ring including a seal.

21. The method of claim 8 wherein said damping insert is larger than its respective recess and damping occurs as a result of loading achieved on opposing sides of said recess and said damping element.

22. A vibration damped, full ring rotating turbine airfoil row comprising:
   a. an airfoil row including substantially circular, coaxial first and second spools, said first and second spools being partially defined by inner and outer first and second spool surfaces respectively, said second spool having a lesser diameter than said first spool, said inner surface of said first spool and said outer surface of said second spool being joined by a plurality of airfoils extending generally radially therebetween, said airfoils being spaced generally equidistant from adjoining airfoils and defining radii of said spools, said second spool being cut between selected ones of said radii thereby forming a plurality of cut lines;
   b. wherein said inner surface of said second spool has a recess associated with each of said cut lines, each recess being substantially bisected by its respective cut line, each of said recesses being partly defined by recess edges and a recess bottom and each of said recesses being configured to receive a damping insert that is slightly larger than said recess such that insertion of an insert into a recess imparts a twist to the airfoils adjacent said recess and creates a load between opposing edges of said recess and said insert; and
   d. a retainer attached to said second spool inner surface for retaining each of said damping inserts in its respective recess;

wherein frictional damping of said rotating turbine airfoil row occurs as a result of a combination of twisting forces between opposing edges of said recess and said insert and centrifugal forces between said insert and said recess bottom.

* * * * *